(12) United States Patent
Mildh et al.

(10) Patent No.: US 8,320,333 B2
(45) Date of Patent: Nov. 27, 2012

(54) METHOD AND APPARATUS FOR SECURE HANDOVER IN A COMMUNICATION NETWORK

(75) Inventors: Gunnar Mildh, Sollentuna (SE); Magnus Lindstrom, Spanga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 288 days.

(21) Appl. No.: 12/680,223

(22) PCT Filed: Oct. 1, 2008

(86) PCT No.: PCT/SE2008/051103
§ 371 (c)(1),
(2), (4) Date: Mar. 26, 2010

(87) PCT Pub. No.: WO2009/045160
PCT Pub. Date: Apr. 9, 2009

(65) Prior Publication Data
US 2010/0265912 A1 Oct. 21, 2010

Related U.S. Application Data

(60) Provisional application No. 60/976,911, filed on Oct. 2, 2007.

(51) Int. Cl.
*H04W 36/00* (2009.01)

(52) U.S. Cl. .................................... 370/331; 370/350

(58) Field of Classification Search .................. 370/331, 370/350, 394
See application file for complete search history.

(56) References Cited

U.S. PATENT DOCUMENTS

| | | | | |
|---|---|---|---|---|
| 2001/0046240 | A1* | 11/2001 | Longoni et al. | 370/503 |
| 2003/0147370 | A1* | 8/2003 | Wu | 370/338 |
| 2003/0157927 | A1* | 8/2003 | Yi et al. | 455/411 |
| 2004/0004947 | A1 | 1/2004 | Herrmann et al. | |
| 2004/0038694 | A1* | 2/2004 | Kuo | 455/515 |
| 2005/0272450 | A1* | 12/2005 | Kato | 455/461 |
| 2007/0258591 | A1* | 11/2007 | Terry et al. | 380/247 |
| 2009/0196422 | A1* | 8/2009 | An | 380/273 |

FOREIGN PATENT DOCUMENTS

| | | |
|---|---|---|
| EP | 1337125 A2 | 8/2003 |
| WO | 03/107706 A1 | 12/2003 |

\* cited by examiner

*Primary Examiner* — Brian D Nguyen
(74) *Attorney, Agent, or Firm* — Coats & Bennett, P.L.L.C.

(57) ABSTRACT

In at least one embodiment taught herein, the point in a packet transmission sequence space at which hyper frame numbers are incremented is changed at least temporarily as part of handover processing, where a mobile station (12) is handed over from a source cell to a target cell. More particularly, in at least one embodiment, changing the triggering point, e.g., changing the transmission sequence number at which HFNs are incremented, is done in a manner that delays a next incrementing of the HFN for a radio bearer that was handed over, therefore giving additional time for the mobile station (12) and the handover target base station (16) to ensure synchronization in the face of possible packet losses in the source and/or target cells arising during the handover event.

23 Claims, 4 Drawing Sheets

METHOD AND APPARATUS FOR SECURE HANDOVER IN A COMMUNICATION NETWORK

BACKGROUND

The present invention relates to inter-node handover in a communication network, and particularly relates to secure, synchronized handovers between nodes. Within the scope of 3GPP E-UTRAN (Long Term Evolution or "LTE") standardization, solutions for inter-eNB/cell handover have been agreed. As an example of inter-node handover, see FIG. 1. As used herein, E-UTRAN denotes the cellular radio system developed/standardized by 3GPP, and "eNB" denotes a E-UTRAN radio base station node (could serve multiple E-UTRAN cells).

The handover solution allows for lossless and in-order delivery of both uplink and downlink packets. For user plane data it has been agreed to use selective packet forwarding. This means that the user plane protocol machine needs to be relocated from the source eNB to the target eNB, meaning that the Packet Data Convergence Protocol (PDCP) sequence numbers are maintained during the handover procedure. Selective forwarding makes it possible for the receiving entity to receive duplicated and out of order packets and still be able to provide in order delivery.

The PDCP sequence numbers are also used as an input to the user plane ciphering process. Each user plane flow (radio bearer) in each direction (uplink/downlink) has its own PDCP sequence number machine. Further, in addition to the PDCP sequence number which is included in every uplink/downlink packet sent over the radio interface, there is also defined an overflow sequence number, or hyper frame number (HFN).

The HFN is also used as input to the ciphering algorithm but it is not sent over the radio interface. The HFN is incremented every time the packet data transmission sequence number (PDCP sequence number) rolls over (e.g. between 255->0). The HFN sequence number is also unique for every Radio Bearer (RB) in both uplink and downlink. The HFN is implicitly incremented both in the UE and eNB every time the PDCP sequence number rolls over (overflow event).

It has been concluded that the ciphering key used in the target cell should be different from the ciphering key used in the source cell, thus avoiding completely the security risk that the same ciphering key and sequence number is used in both the source and target cell. However, to date it has not been determined in 3GPP what should be done with the HFN during handover. Because the ciphering key is changed at the handover, from a security point of view it is acceptable to re-use in the target cell the old HFN values that were in use in the source cell.

However, no good solution has been proposed for managing the HFN numbers during the handover. One possible solution is to set the HFN to zero or some fixed value in the target cell. One problem with this approach is that if, at the time of handover (HO), the PDCP sequence number for a given one of the radio bearers being handed over is very close to the value where the HFN should be incremented, there is a risk that the mobile station (also referred to as user equipment or "UE") and the target eNB (base station) would get de-synchronized.

As one example, consider that the mobile station after entering the target cell receives packets with sequence numbers (SNs) pertaining to just after the HFN increment point, but in the source cell the mobile station had only received packets before the HFN increment point. In this circumstance, the mobile station has no way of knowing whether the HFN was incremented in the source cell (but there was packet loss hiding the event from the mobile station in the source cell) or should have been incremented in the target cell (but there was packet loss hiding the event from the mobile station in the target cell). Because of this ambiguity, the mobile station behavior cannot be specified. For the two cases, different HFN values need to be assumed by the mobile station for the affected downlink radio bearer, but mobile station cannot determine which HFN value should be used.

Another approach to the synchronization problem relies on synchronizing the PDCP sequence number between the UE and the target eNB. It is technically possible to send explicit signaling between the UE and the eNB in the target cell to inform the other entity of the next expected PDPC sequence for each radio bearer being handed over. Doing so allows the other entity to know when the HFN is incremented. One disadvantage of this solution is that it increases the required signaling and introduces longer service interruption, because it is not be possible to send any user plane data during the synchronization step.

Another solution is to synchronize the HFN values between the source and target eNB and continue in the target cell with the same HFN as in source. It is technically possible to send explicit signaling between the source and target eNB so that the target eNB is aware of the uplink and downlink HFNs. This signaling may only take place after the last packet was sent/received in the source eNB. Otherwise, there is a risk that the HFN values will be out of date in the target eNB. One disadvantage to this solution is that it increases the required signaling between the eNBs and it could introduce delays or cause de-synchronization if the message from the source eNB to the target eNB is lost or delayed.

SUMMARY

In one embodiment, a method of maintaining HFN synchronization between a mobile station and a target cell (e.g., the target cell base station) is based on the UE and the handover target base station temporarily using a fixed HFN number (e.g., zero) which is not incremented at the normal overflow event. Here, a "normal overflow event" may be the rollover point in the PDCP sequence (e.g., "255") at which point the HFN is normally incremented. Rather than incrementing at the normal rollover point in the PDCP sequence, another value in the PDCP sequence may be designated for triggering HFN incrementing. For example, a sequence value further away in the sequence space may be designated, so that HFN incrementing is delayed or otherwise deferred, thereby allowing the mobile station and the target cell time to ensure synchronization subsequent to the handover.

For example, one embodiment of a method for use in a wireless communication network, such as in an E-UTRAN (LTE) network, preserves hyper frame number synchronization between a mobile station and a handover target base station. The method includes, for a given radio bearer, initializing the hyper frame numbers used at the mobile station and at the handover target base station to the same value, and selecting a value from two or more possible values in a packet transmission sequence space to be used as a triggering value for incrementing the hyper frame numbers at the mobile station and at the handover target base station. The method further includes signaling the selected triggering value between the mobile station and the handover target base station, such that they both operate with the same triggering value.

The above method may be applied to all radio bearers (uplink and downlink) involved in the handover. In at least one embodiment, if the given radio bearer is an uplink radio bearer, the mobile station selects the triggering value and signals the triggering value to the handover target base station. If the radio bearer is a downlink radio bearer, the handover target base station selects the triggering value and signals it to the mobile station. Signaling may be explicit control plane signaling, or may be implicit signaling sent over the user plane radio bearer.

In general, for a given radio bearer, the mobile station operates as either a receiver or a transmitter, and the base station correspondingly operates as either a transmitter or receiver. It should be understood that it is contemplated herein that either the receiver or transmitter determines and/or signals the triggering value to be used. That is, in one or more embodiments, the receiver signals the triggering value to be used, and in other embodiments the transmitter signals the triggering value to be used.

Regardless, selecting the value in the packet transmission sequence space to be used as the triggering value comprises, in at least one embodiment, selecting a value that is at or about a maximum distance from a last known or expected value used for transmitting packet data on the given radio bearer with respect to a handover source base station. For example, the sequence space may have two possible trigger points: a first point at the rollover value of the sequence space (e.g., at the 255-to-0 rollover used for PDCP sequence numbers), and second point a maximum distance away from the first point, i.e., at the 127 value. With this arrangement, the first point may be used as the nominal triggering point for incrementing HFNs, but the second point may be used at least temporarily in the target cell, to delay the incrementing of the HFN after handover.

Such processing may be done in the mobile station and in the base station. For example, one embodiment of a mobile station for use in a wireless communication network that uses HFNs for synchronization comprises a processing circuit that is configured to preserve hyper frame number synchronization with a handover target base station on an uplink radio bearer. The processing circuit, which may be hardware, software, or any combination thereof, is configured to select a value from two or more possible values in a packet transmission sequence space to be used as a triggering value for incrementing the hyper frame number used at the mobile station, and signal the selected triggering value to the handover target base station.

Similarly, in one or more embodiments, a base station for use in a wireless communication network that uses HFNs for synchronization comprises a processing circuit configured to receive a mobile station in handover and to preserve hyper frame number synchronization with the mobile station on a downlink radio bearer. The processing circuit, which may be hardware, software, or any combination thereof, is configured to select a value from two or more possible values in a packet transmission sequence space to be used as a triggering value for incrementing the hyper frame number used at the base station, and signal the selected triggering value to the mobile station.

Thus, in at least one embodiment taught herein, the point in a packet transmission sequence space at which hyper frame numbers are incremented is changed at least temporarily as part of handover processing, where a mobile station is handed over from a source cell to a target cell. More particularly, in at least one embodiment, changing the triggering point, e.g., changing the transmission sequence number at which HFNs are incremented, is done in a manner that delays a next incrementing of the HFN for a radio bearer that was handed over. Doing so provides additional time for the mobile station and the handover target base station to ensure synchronization in the face of possible packet losses in the source and/or target cells arising during the handover event.

DETAILED DESCRIPTION

Figure 1A:
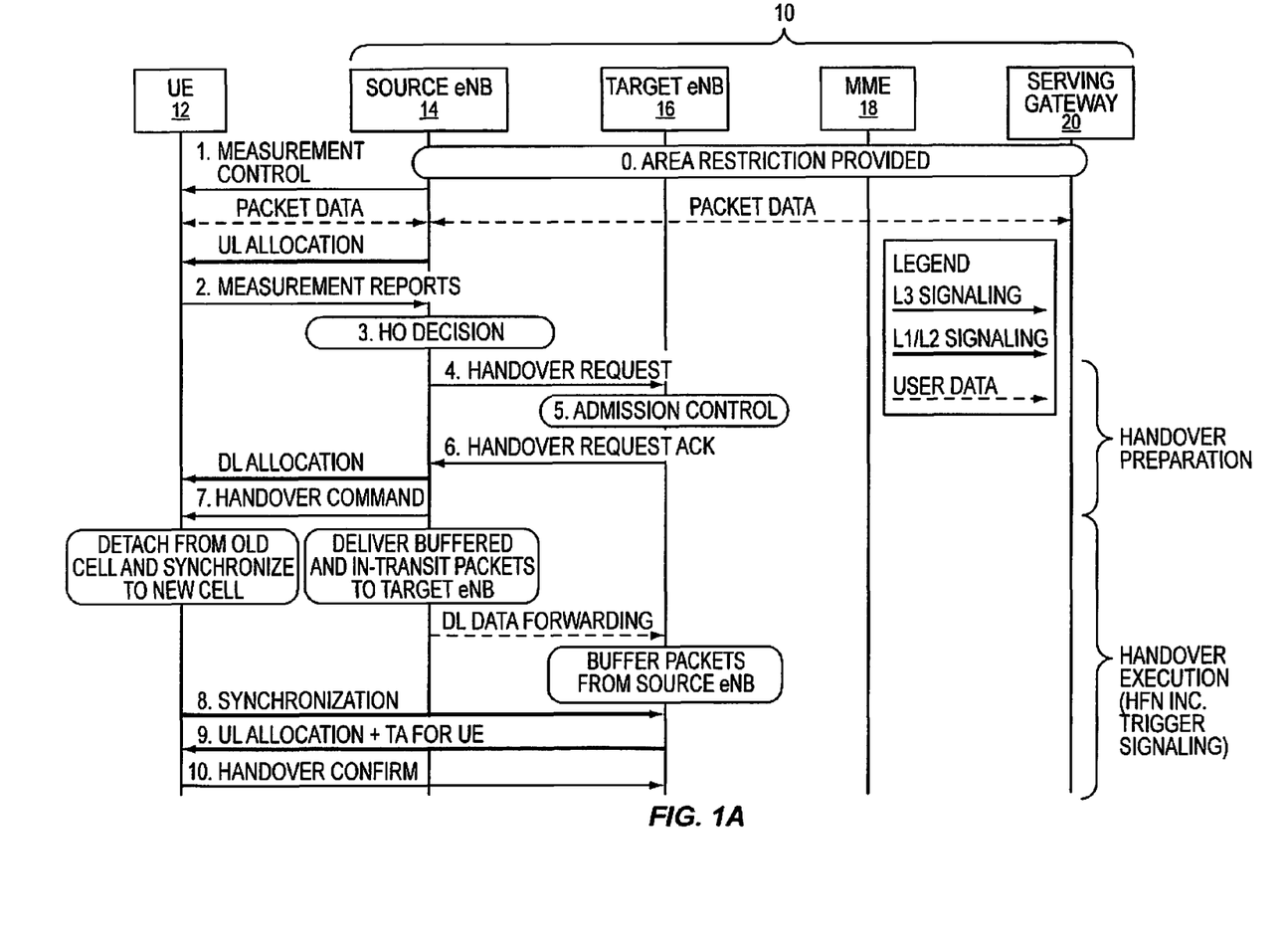
FIG. 1 is a call flow diagram illustrating one embodiment of mobile station handover between handover source and target base stations in a wireless communication network, including signaling of triggering values for incrementing hyper frame numbers at the mobile station and the handover target base station.
Figure 1B:
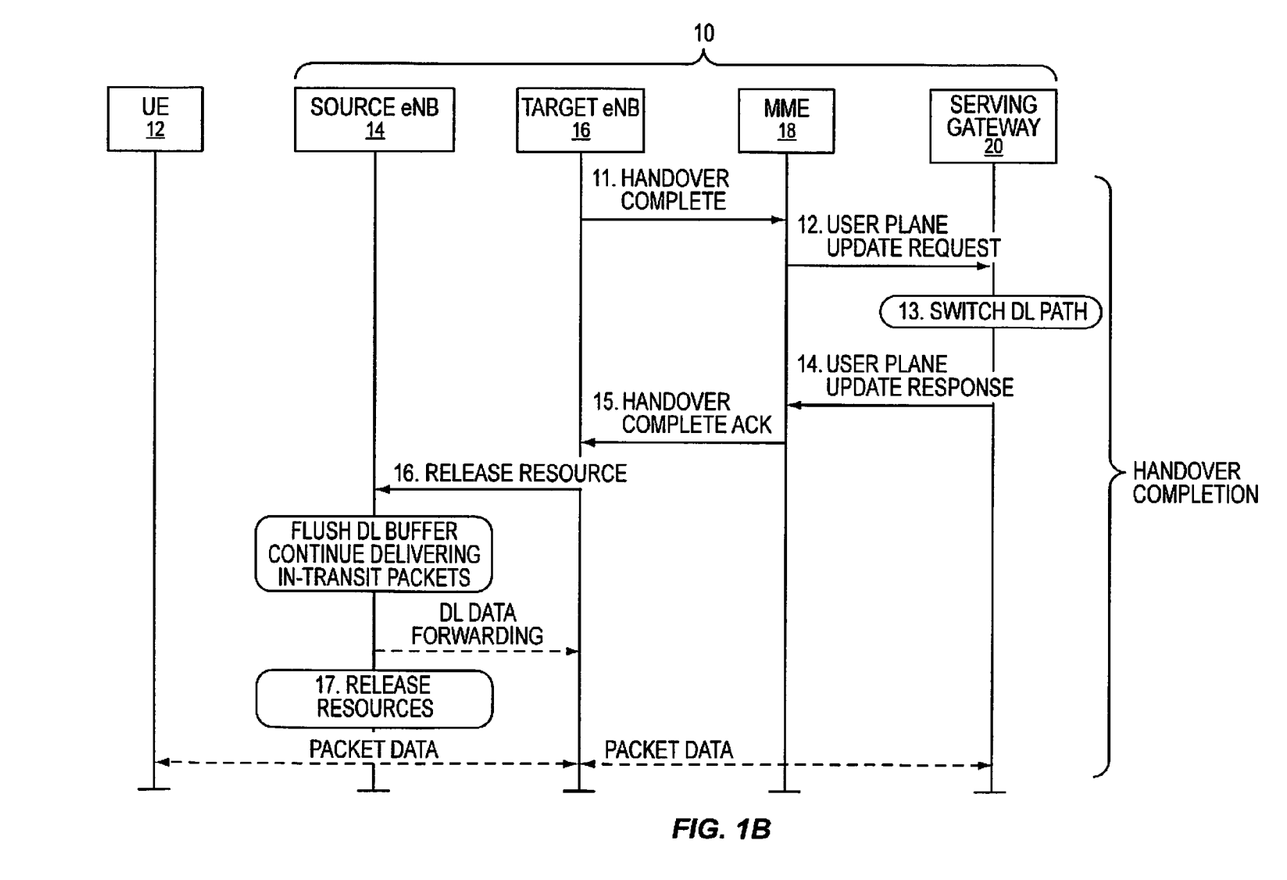

FIG. 1 is a call flow diagram illustrating handover processing flow for a wireless communication network 10 that performs handover of a mobile station 12 from a handover source base station 14 to a handover target base station 16. As one example, the network 10—which is partially illustrated in FIG. 1—comprises a 3GPP E-UTRAN (Long Term Evolution or "LTE") network.

Figure 2:
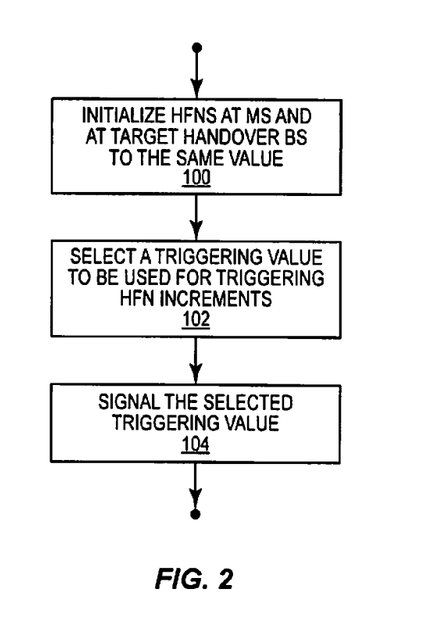
FIG. 2 is a logic flow diagram illustrating one embodiment of a method of selecting and signaling triggering values for incrementing hyper frame numbers as part of handover execution processing.

The network 10 uses hyper frame numbers (HFNs) for synchronization, and, with reference to the network 10, the teachings herein provide a method of preserving HFN synchronization between the mobile station ("UE") 12 and the handover target base station 16 (enhanced Node B or "eNB"). FIG. 2 illustrates one embodiment of the method, including, for a given radio bearer, initializing the HFNs used at the mobile station 12 and at the handover target base station 16 to the same value (Block 100), and selecting a value from two or more possible values in a packet transmission sequence space to be used as a triggering value for incrementing the HFNs at the mobile station 12 and at the handover target base station 16 (Block 102). The method continues with signaling the selected triggering value between the mobile station 12 and the handover target base station 16 (Block 104), such that they both operate with the same triggering value.

The above processing may be performed in hardware, software, or any combination thereof. If such processing is computer-implemented, in whole or in part, it will be understood that, in one embodiment, a microprocessor, digital signal processor, or other digital processing circuit is configured or otherwise specially adapted to perform such processing, based on executing stored computer program instructions. The stored program instructions comprise a computer program, or part of a computer program, and are held, for example, within non-volatile memory.

Figure 3:
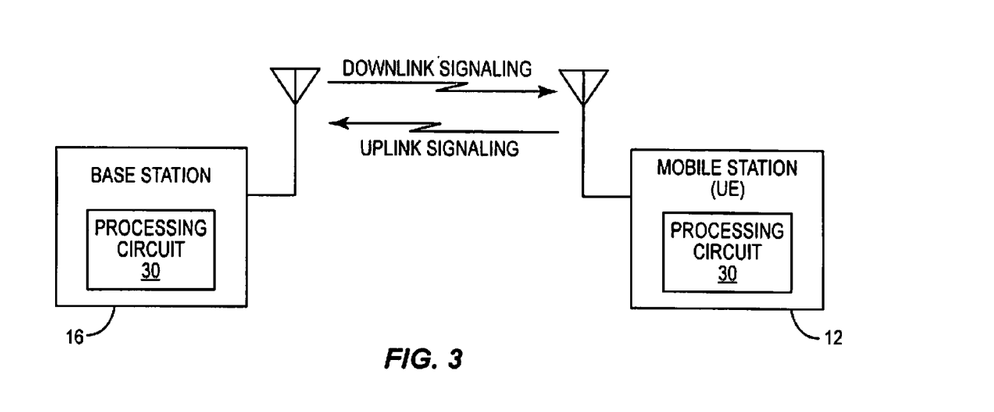
FIG. 3 is a block diagram of a base station and a mobile station, each including a processing circuit configured for selecting and signaling triggering values for incrementing hyper frame number as part of handover execution processing.

FIG. 3 illustrates one embodiment of the mobile station 12, including a processing circuit 30, which is configured to carry out the method outlined in FIG. 2, for one or more uplink radio bearers. FIG. 3 further illustrates one embodiment of the handover target base station 16, which includes a processing circuit 30, configured to carry out the method outlined in FIG. 2, for one or more downlink radio bearers. The same reference number 30 is used for the base station and mobile station processing circuits, given the complementary HFN processing performed by each for downlink and uplink radio bearers, respectively. However, it should be understood that the handover target base station 16 generally will have different digital processing circuitry than the mobile station 12, and the processing circuit 30 in the handover target base station 16 therefore may have a different physical/functional implementation than the processing circuit 30 as implemented in the mobile station 12.

Regarding the mobile station 12, the processing circuit 30 is configured to preserve HFN synchronization with the handover target base station 16 on an uplink radio bearer by selecting a value from two or more possible values in a packet transmission sequence space to be used as a triggering value for incrementing the HFN used at the mobile station 12, and signaling the selected triggering value to the handover target base station 16. In one or more embodiments, the mobile station 12 temporarily operates with the selected triggering value as a temporary rollover point in the packet transmission sequence space, and subsequently reverts to operating with a normal rollover point in the packet transmission sequence space as the triggering value for incrementing the HFN used at the mobile station 12. The mobile station 12 transmits explicit control plane signaling to indicate the triggering value to the handover target base station 16, in one or more embodiments. Alternatively, in one or more other embodiments, the mobile station 12 implicitly signals the triggering value to the handover target base station 16 via user plane signaling on the uplink radio bearer.

Further, in at least one embodiment, the mobile station 12 (e.g., by configuration of the processing circuit 30) selects the value in the packet transmission sequence space to be used as the triggering value by selecting a value that is at or about a maximum distance from a last known or expected value used for transmitting packet data on the uplink radio bearer with respect to a handover source base station. Doing so delays a next incrementing of the HFN, as compared to allowing the HFN to increment at a normal rollover point in the packet transmission sequence space. The extra time allows for the mobile station 12 and the target handover base station 16 to complete handover synchronization and other processing before the next HFN incrementing occurs.

Similarly, the processing circuit 30 as implemented in the handover target base station 16 is configured to receive the mobile station 12 (or any other mobile station) in handover and to preserve HFN synchronization with the mobile station 12 on a downlink radio bearer. The processing circuit 30 preserves synchronization by selecting a value from two or more possible values in a packet transmission sequence space to be used as a triggering value for incrementing the HFN used at the handover target base station 16 and signaling the selected triggering value to the mobile station 12.

In one or more embodiments, the handover target base station 16 temporarily operates with the selected triggering value as a temporary rollover point in the packet transmission sequence space, and subsequently reverts to operating with a normal rollover point in the packet transmission sequence space as the triggering value for incrementing the HFN used at the handover target base station 16. The handover target base station 16 is configured to indicate the triggering value to the mobile station 12 using explicit control plane signaling, or using user plane signaling on the downlink radio bearer for which the HFN triggering value has been selected.

With the above in mind, and turning back to the logic flow diagram of FIG. 2, it will be understood that the method embodied in the processing logic of FIG. 2 can be carried out for each uplink and downlink radio bearer between the mobile station 12 and the handover target base station 16. That is, for each uplink radio bearer involved in the handover of the mobile station 12 from the handover source base station 14 to the handover target base station 16, the processing circuit 30 in the mobile station 12 selects a triggering value for HFN incrementing and signals the value to the handover target base station 16. Similarly, for each downlink radio bearer involved in the handover of the mobile station 12 from the handover source base station 14 to the handover target base station 16, the processing circuit 30 in the handover target base station 16 selects a triggering value for HFN incrementing and signals the value to the mobile station 12.

In another embodiment, for any given radio bearer involved in the handover, one of the mobile station 12 and the handover target base station 16 operates as a sender, and the other one of the mobile station 12 and the handover target base station 16 operates as a receiver, and the receiver selects the triggering value and correspondingly signals the sender. Thus, the entity receiving signals via the given radio bearer is the entity that selects and signals the triggering value for HFN incrementing. Of course, in other embodiments, such as those described immediately above, the sending entity for a given radio bearer selects and signals the triggering value for HFN incrementing.

In either case, the selected triggering value in one or more embodiments is used temporarily for handover processing, and subsequently a normal rollover point in the packet transmission sequence space is used as the triggering value for incrementing hyper frame numbers. With this in mind, in one or more embodiments determining the selected triggering value is done in a manner that delays a next incrementing of the HFNs as compared to using the normal rollover point as the triggering value. Doing so provides additional time for the mobile station 12 and the target handover base station 16 to synchronize before the next incrementing of HFNs. Thus, in one or more broad embodiments, for a given radio bearer, selecting a value from two or more possible values in a packet transmission sequence space to be used as a triggering value for incrementing the HFNs at the mobile station 12 and at the handover target base station 16 comprises temporarily changing from a normal rollover point in the packet transmission sequence space to another rollover point in the packet transmission sequence space to provide additional time for the mobile station 12 and the handover target base station 16 to synchronize before a next incrementing of the hyper frame numbers.

Thus, with the above teachings in mind, those skilled in the art will appreciate that for one or more embodiments taught herein, the HFNs at the sender and receiver for any given radio bearer involved in handover generally will not be incremented at the normal rollover point. For handover of a UE (e.g., mobile station 12) to a target eNB (e.g., handover target base station 16), the UE will indicate in the uplink signal to the eNB, at which point (PDCP sequence value) the HFN should be incremented for each uplink radio bearer. Similarly, the eNB will indicate in the downlink signal to the UE which rollover point should be used for each downlink radio bearer.

The number of potential rollover points may be flexible. A typical solution is to use two rollover points, one at the normal rollover point (e.g., 255->0) and another point at half of the maximum sequence number (e.g., 127->128). This means that if the PDCP sequence number is close to the normal rollover point at the time of the handover, the sender may avoid incrementing the HFN value in the target cell at this point and instead tell the receiver to increment the HFN at some other point. (Or the receiver may tell the sender which triggering point to use for incrementing the HFN.)

Figure 4:
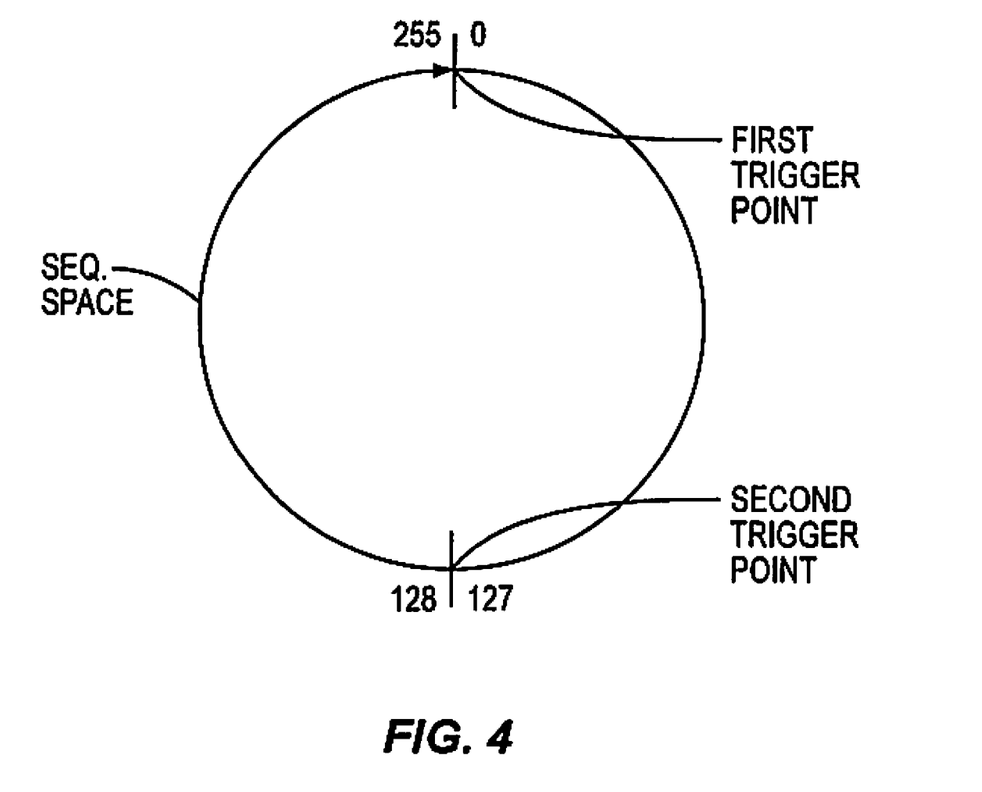
FIG. 4 is a diagram illustrating one embodiment of a packet transmission sequence space from which a triggering value for incrementing hyper frame numbers is selected.

FIG. 4, for example, illustrates a packet transmission sequence space, e.g., PDCP sequence space, that ranges from 0 to 255. There are two possible trigger points for incrementing HFNs: a first point at the 255-to-0 "rollover" point in the sequence numbers, and a second point at the 127-to-128 point in the sequence numbers. If, for the source cell, the packet sequence numbers on a given radio bearer are close to the first point, for example, the HFN incrementing event may be delayed for that radio bearer by temporarily changing the incrementing event to be triggered at the second point, rather than the first point. (Effectively, the triggering point in the sequence space is advanced, or otherwise moved, to delay incrementing.)

Note that one bit, for example, may be used to indicate which one of two possible triggering points should be used, e.g., a "0" indicates that the nominal (255-0 rollover) point should be used, while a "1" indicates that the shifted, 127-128 point should be used to trigger HFN increments. If four points in the sequence space are defined as possible trigger points for incrementing the HFN, then two bits may be used to signal which one of the four is to be selected for use. (Note that as more possible points for triggering HFN incrementing are defined, more flexibility and/or greater control is gained in terms of delaying post-handover HFN increments. In one example, every packet sequence number is a possible triggering point, meaning that the delay may be maximized for any sequence number position in use at the time of handover.)

In any case, the conditions for selecting the point to increment the HFN in the target cell may be specified, e.g., the sender should select the last potential point that was passed in the source cell. This would give the maximum time for the sender to inform the receiver about the target switching point, while still avoiding using the same HFN, ciphering key and PDCP sequence number for two different packets in the target cell (which is bad to do from a security point of view).

A number of different solutions may be considered for how to inform the receiving entity at which point (PDCP value) it should increment the HFN. One embodiment contemplated herein uses explicit control plane signaling messages (e.g., RRC) in the uplink and downlink. One such message that may be used in the uplink is the Handover Complete (or RRC Connection Re-configuration Complete) message which could include information about at which point the HFN should be incremented (e.g., after 255 or 127) for each radio bearer. A similar message may be introduced in the downlink.

Another embodiment contemplated herein uses implicit user plane signaling on each radio bearer by introducing sequence number jumps in a specific way before the desired place were the HFN should be incremented. For example, say that HFN for a given radio bearer should be incremented at the transition between 127 and 128. This may be signaled by not using any odd PDCP sequence numbers from 100 to 128. This is possible since the receiving entity does not require that the PDCP numbers be continuous. If the receiver does not detect any odd packets from 100 to 128, but detects some even packets, it will know that 128 should use a higher HFN value. Once the HFN number has been incremented, it may in the future continue to be incremented either at the same place or at the normal rollover point.

As non-limiting examples, the teachings herein provide a number of advantages. These advantages include but are not limited to the fact that the data traffic in the uplink and downlink may continue without interruptions after the handover. There is no need to wait for any HFN synchronization procedure to finish. The actual HFN synchronization is delayed until later after the handover event, by virtue of at least temporarily changing or shifting the packet sequence numbers at which the HFNs for the radio bearers handed over are incremented. Delaying the HFN incrementing aids security in relation to the handover event because preserving HFN synchronization between the target cell and the handed-over mobile station ensures that neither the mobile station nor target cell base station reuse the same ciphering key, packet sequence number, and HFN for different packets.

Also, to reiterate, either entity (the radio bearer transmitter or the radio bearer receiver) may make the decision on which triggering point to use for HFN incrementing and signal that to the other entity. For example, the receiver—base station for an uplink radio bearer and mobile station for a downlink radio bearer—has relatively good knowledge of the packet sequence numbers on a given radio bearer, both before and after handover. Thus, the receiver may decide on the suitable triggering point. Of course, as stated earlier, in one or more other embodiments, the transmitter (sender) makes that decision.

Of course, the present invention is not limited by the foregoing discussion, nor is it limited by the accompanying figures. Instead, the present invention is limited by the following claims and their legal equivalents.

What is claimed is:

1. In a wireless communication network that uses hyper frame numbers for synchronization, a method of preserving hyper frame number synchronization between a mobile station and a handover target base station, the method comprising:

for a given radio bearer, initializing the hyper frame numbers used at the mobile station and at the handover target base station to the same value;

selecting a value from two or more possible values in a packet transmission sequence space to be used as a triggering value for incrementing the hyper frame numbers at the mobile station and at the handover target base station; and signaling the selected triggering value between the mobile station and the handover target base station, such that they both operate with the same triggering value;

wherein the selecting the value comprises selecting the value that is at or about a maximum distance from a last known or expected value used for transmitting packet data on the given radio bearer with respect to a handover source base station.

2. The method of claim 1, further comprising carrying out the method of claim 1 for each uplink and downlink radio bearer between the mobile station and the handover target base station.

3. The method of claim 1, wherein, if the given radio bearer is an uplink radio bearer, the mobile station selects the triggering value and signals the triggering value to the handover target base station.

4. The method of claim 3, wherein the mobile station transmits explicit control plane signaling to indicate the triggering value to the handover target base station.

5. The method of claim 3, wherein the mobile station implicitly signals the triggering value to the handover target base station via user plane signaling on the uplink radio bearer.

6. The method of claim 1, wherein, if the given radio bearer is a downlink radio bearer, the handover target base station selects the triggering value and signals the triggering value to the mobile station.

7. The method of claim 6, wherein the handover target base station transmits explicit control plane signaling to indicate the triggering value to the mobile station.

8. The method of claim 6, wherein the handover target base station implicitly signals the triggering value to the mobile station via user plane signaling on the downlink radio bearer.

9. The method of claim 1, wherein, for the given radio bearer, one of the mobile station and the handover target base station operates as a sender, and the other one of the mobile station and the handover target base station operates as a receiver, and wherein the receiver selects the triggering value and correspondingly signals the sender.

10. The method of claim 1, wherein, for the given radio bearer, one of the mobile station and the handover target base station operates as a sender, and the other one of the mobile station and the handover target base station operates as a receiver, and wherein the sender selects the triggering value and correspondingly signals the receiver.

11. The method of claim 1, further comprising using the selected triggering value temporarily for handover processing, and subsequently using a normal rollover point in the packet transmission sequence space as the triggering value for incrementing hyper frame numbers.

12. The method of claim 1, wherein the triggering value is selected in a manner that delays a next incrementing of the hyper frame numbers as compared to using a normal rollover point as the triggering value, to provide additional time for the mobile station and the handover target base station to synchronize before the next incrementing of hyper frame numbers.

13. The method of claim 1, wherein selecting a value from two or more possible values in a packet transmission sequence space to be used as a triggering value for incrementing the hyper frame numbers at the mobile station and at the handover target base station comprises temporarily changing from a normal rollover point in the packet transmission sequence space to another rollover point in the packet transmission sequence space, to provide additional time for the mobile station and the handover target base station to synchronize before a next incrementing of the hyper frame numbers.

14. A mobile station for use in a wireless communication network that uses hyper frame numbers for synchronization, the mobile station comprising a hardware-based processing circuit configured to preserve hyper frame number synchronization with a handover target base station on an uplink radio bearer, based on said processing circuit being configured to:
select a value from two or more possible values in a packet transmission sequence space to be used as a triggering value for incrementing the hyper frame number used at the mobile station; and
signal the selected triggering value to the handover target base station;
wherein the selected value is at or about a maximum distance from a last known or expected value used for transmitting packet data on the uplink radio bearer with respect to a handover source base station.

15. The mobile station of claim 14, wherein the mobile station is configured to temporarily operate with the selected triggering value as a temporary rollover point in the packet transmission sequence space, and subsequently revert to operating with a normal rollover point in the packet transmission sequence space as the triggering value for incrementing the hyper frame number used at the mobile station.

16. The mobile station of claim 14, wherein the mobile station is configured to transmit explicit control plane signaling to indicate the triggering value to the handover target base station.

17. The mobile station of claim 14, wherein the mobile station is configured to implicitly signal the triggering value to the handover target base station via user plane signaling on the uplink radio bearer.

18. The mobile station of claim 14, wherein the wireless communication network comprises an E-UTRAN (LTE) wireless communication network, and the mobile station comprises an E-UTRAN (LTE) mobile station.

19. A base station for use in a wireless communication network that uses hyper frame numbers for synchronization, the base station comprising a hardware-based processing circuit configured to receive a mobile station in handover and to preserve hyper frame number synchronization with the mobile station on a downlink radio bearer based on said processing circuit being configured to:
select a value from two or more possible values in a packet transmission sequence space to be used as a triggering value for incrementing the hyper frame number used at the base station; and
signal the selected triggering value to the mobile station;
wherein the selected value is at or about a maximum distance from a last known or expected value used for transmitting packet data on the downlink radio bearer from a handover source base station.

20. The base station of claim 19, wherein the base station is configured to temporarily operate with the selected triggering value as a temporary rollover point in the packet transmission sequence space, and subsequently revert to operating with a normal rollover point in the packet transmission sequence space as the triggering value for incrementing the hyper frame number used at the base station.

21. The base station of claim 19, wherein the base station is configured to transmit explicit control plane signaling to indicate the triggering value to the mobile station.

22. The base station of claim 19, wherein the base station is configured to implicitly signal the triggering value to the mobile station via user plane signaling on the downlink radio bearer.

23. The base station of claim 19, wherein the wireless communication network comprises an E-UTRAN (LTE) wireless communication network and the base station comprises an E-UTRAN (LTE) base station.

* * * * *

UNITED STATES PATENT AND TRADEMARK OFFICE
CERTIFICATE OF CORRECTION

PATENT NO. : 8,320,333 B2  
APPLICATION NO. : 12/680223  
DATED : November 27, 2012  
INVENTOR(S) : Mildh et al.

Page 1 of 1

It is certified that error appears in the above-identified patent and that said Letters Patent is hereby corrected as shown below:

On the title page, item (75), under "Inventors", in Column 1, Line 2,
delete "Lindstrom, Spanga" and insert -- Lindström, Spånga --, therefor.

Signed and Sealed this
Second Day of April, 2013

Teresa Stanek Rea
*Acting Director of the United States Patent and Trademark Office*